United States Patent [19]

Tortorello

[11] Patent Number: 6,023,547
[45] Date of Patent: *Feb. 8, 2000

[54] RADIATION CURABLE COMPOSITION COMPRISING A URETHANE OLIGOMER HAVING A POLYESTER BACKBONE

[75] Inventor: Anthony J. Tortorello, Elgin, Ill.

[73] Assignee: DSM N.V., Heerlen, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/871,535

[22] Filed: Jun. 9, 1997

[51] Int. Cl.⁷ .............................. G02B 6/44; G02B 6/02; G02B 6/16; C08G 18/28
[52] U.S. Cl. .................... 385/114; 385/123; 385/126; 385/145; 385/128; 428/378; 522/90; 522/97; 528/65; 528/66
[58] Field of Search .................................. 385/128, 123, 385/124, 125, 126, 127, 145, 143, 144, 114; 522/96, 90, 92, 97, 93; 526/301; 65/447; 528/65, 59, 66; 428/392, 375

[56] References Cited

U.S. PATENT DOCUMENTS

| | | | |
|---|---|---|---|
| 4,058,506 | 11/1977 | Vaeth et al. | 260/75 NP |
| 4,112,017 | 9/1978 | Howard . | |
| 4,551,518 | 11/1985 | Matsumoto et al. | 528/80 |
| 4,657,817 | 4/1987 | Okita et al. . | |
| 5,146,531 | 9/1992 | Shustack . | |
| 5,229,433 | 7/1993 | Schunck | 522/96 |
| 5,416,880 | 5/1995 | Edwards et al. | 385/128 |
| 5,461,691 | 10/1995 | Schunck | 385/123 |
| 5,679,721 | 10/1997 | Courtoy et al. | 522/96 X |

FOREIGN PATENT DOCUMENTS

| | | |
|---|---|---|
| 0112005 | 6/1984 | European Pat. Off. . |
| 0407004 | 1/1991 | European Pat. Off. . |
| 0508409 | 10/1992 | European Pat. Off. . |
| 539030 A1 | 4/1993 | European Pat. Off. . |
| 0565798 A1 | 10/1993 | European Pat. Off. . |
| 3840644 A1 | 6/1990 | Germany . |
| 242146 | 7/1995 | New Zealand . |
| WO 93/21248 | 10/1993 | WIPO . |
| WO 96/02596 | 2/1996 | WIPO . |
| WO 96/11217 | 4/1996 | WIPO . |
| WO 96/11965 | 4/1996 | WIPO . |

OTHER PUBLICATIONS

Abstract of JP 01152114, Jun. 1989, Japan.
Abstract of JP 04296315, Oct. 1992, Japan.

*Primary Examiner*—Susan W. Berman
*Attorney, Agent, or Firm*—Pillsbury Madison & Sutro

[57] ABSTRACT

A radiation curable composition comprising a urethane oligomer with a polyester backbone which composition, when cured, has improved hydrolytic stability. The composition comprises a urethane oligomer, having a polyester backbone with a number average molecular weight of less than about 1000, wherein the polyester backbone is at least in part based on a diol component wherein at least one carbon at the β-position with respect to a hydroxyl group bears two carbon-containing substituents having a total of at least three carbon atoms. Alternatively, when the composition comprises a urethane oligomer with a number average molecular weight of less than about 2000, having a polyester polyol backbone with a number average molecular weight of less than about 1000, the polyester backbone is at least in part based on a diol component wherein at least one carbon at the β-position with respect to a hydroxyl group bears at least one carbon-containing substituent.

21 Claims, No Drawings

RADIATION CURABLE COMPOSITION COMPRISING A URETHANE OLIGOMER HAVING A POLYESTER BACKBONE

FIELD OF THE INVENTION

The invention relates to radiation curable compositions comprising a urethane oligomer having a polyester backbone, which composition results in cured coatings that have excellent hydrolysis resistance characteristics. The compositions are in particular useful as covering layers for glass optical fibers, such as secondary coatings, ink layers, matrix materials, bundling materials and up jacketing coatings.

DESCRIPTION OF RELATED ART

Glass optical fibers are provided with protective coatings immediately after spinning the molten glass. Generally, two coatings are applied, a primary coating of a relatively soft, flexible resin directly on the glass surface, and a harder resin, a secondary coating, on the primary coating. The individual fibers generally are combined in larger structures such as cables. Cables may comprise individual fibers, or fiber ribbon structures. The optical fiber ribbon generally is made from 2, 4, 6, 8 or 12 optical fibers, generally arranged in a plane, and bonded together with a so-called matrix material. Several ribbons can be bundled together using bundling materials. Further, individual fibers often are provided with a coloring or ink layer to be able to identify individual fibers. In certain cases, the individually coated fibers that have a thickness of about 250 µm, are provided with a further coating layer to make a thicker, and thereby more easily handlable, fiber. Such a coating is denoted as an up jacketing coating. All of the resins presently in use for these applications are radiation curable compositions. In many of these compositions, use is made of a urethane oligomer having reactive termini and a polymer backbone. Further, the compositions generally comprise reactive diluents, photoinitiators to render the compositions UV-curable, and suitable additives.

As polymer backbone for the urethane oligomer, many materials have been suggested. In the synthesis of the oligomer backbone, polyols have been used such as hydrocarbon polyols, polyether polyols, polycarbonate polyols and polyester polyols. Polyester polyols are particularly attractive because of their commercial availability, oxidative stability and versatility to tailor the characteristics of the coating by tailoring the backbone. Polyester polyols are described for use in optical fiber coatings in e.g. U.S. Pat. No. 5,146,531 and EP-A-539030. However, polyester polyols in general are susceptible to hydrolysis. According to EP-A-539030, resistance to hydrolysis may be improved by using a dimer acid as a major part of the polyacid component. According to U.S. Pat. No. 5,146,531, the coating composition should be formulated to achieve maximum hydrophobicity. Despite these efforts, polyester based urethane oligomers having improved hydrolytic stability are needed.

SUMMARY OF THE INVENTION

The invention provides radiation curable compositions comprising a urethane oligomer with a polyester backbone, which composition, when cured, has improved hydrolytic stability. In particular, the invention provides a radiation curable composition comprising a urethane oligomer with a number average molecular weight of less than about 2000, having a polyester backbone with a number average molecular weight of less than about 1000, wherein the polyester backbone is at least in part based on a diol component which has a substituted carbon at the β-position with respect to the hydroxyl groups.

The invention further provides a coated optical fiber having a primary and a secondary coating in which the secondary coating comprises a radiation cured composition which comprises, prior to cure, a urethane oligomer with a number average molecular weight of less than about 2000, having a polyester backbone with a number average molecular weight of less than about 1000, wherein the polyester backbone is at least in part based on a diol component which has a substituted carbon at the β-position with respect to the hydroxyl groups.

The invention further provides a coated optical fiber having a primary and a secondary coating, and a radiation cured ink layer, in which the ink comprises, prior to cure, a urethane oligomer with a number average molecular weight of less than about 2000, having a polyester backbone with a number average molecular weight of less than about 1000, wherein the polyester backbone is at least in part based on a diol component which has a substituted carbon at the β-position with respect to the hydroxyl groups.

The invention further provides a ribbon with a plurality of coated optical fibers, the fibers being bonded together with a radiation cured matrix material, in which the matrix material comprises, prior to cure, a urethane oligomer with a number average molecular weight of less than about 2000, having a polyester backbone with a number average molecular weight of less than about 1000, wherein the polyester backbone is at least in part based on a diol component which has a substituted carbon at the β-position with respect to the hydroxyl groups.

The invention further provides a coated optical fiber having a primary coating and at least one further coating, the coated fiber having a total thickness of over 300 µm including an up jacketing cured coating as the outermost layer, in which the upjacketing coating comprises, prior to cure, a urethane oligomer with a number average molecular weight of less than about 2000, having a polyester backbone with a number average molecular weight of less than about 1000, wherein the polyester backbone is at least in part based on a diol component which has a substituted carbon at the β-position with respect to the hydroxyl groups.

The invention further provides a ribbon structure comprising a plurality of ribbons, being bonded together with a radiation cured bundling material, in which the bundling material comprises, prior to cure, a urethane oligomer with a number average molecular weight of less than about 2000, having a polyester backbone with a number average molecular weight of less than about 1000, wherein the polyester backbone is at least in part based on a diol component which has a substituted carbon at the β-position with respect to the hydroxyl groups.

The invention further provides a urethane oligomer comprising a polyester backbone, urethane linking groups and reactive termini, in which the polyester backbone has a molecular weight of less than about 1000 and consists mainly of polymerized diols and diacid components, wherein the diol component comprises 30 wt. % or more of a diol having one or more groups according to formula 1

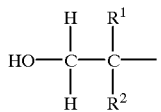

(1)

in which $R^1$ and $R^2$ independently are an alkyl and/or aryl group comprising one to twelve carbon atoms, provided that the number of carbon atoms in $R^1+R^2$ is 3 or higher.

DETAILED DESCRIPTION OF THE INVENTION

The invention provides radiation curable compositions comprising a urethane oligomer with a polyester backbone, which composition, when cured, has improved hydrolytic stability. In particular, the invention provides a radiation curable composition comprising a urethane oligomer with a number average molecular weight of less than about 2000, having a polyester backbone with a number average molecular weight of less than about 1000, wherein the polyester backbone is at least in part based on a diol component which has a substituted carbon at the β-position with respect to the hydroxyl groups.

The invention further provides a urethane oligomer comprising a polyester backbone, urethane linking groups and reactive termini, in which the polyester backbone has a molecular weight of less than about 1000 and consists mainly of polymerized dials and diacid components, wherein the dial component consists of 30 wt. % or more of a dial having one or more groups according to formula 1

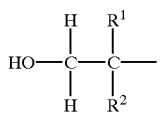

(1)

in which $R^1$ and $R^2$ independently are an alkyl and/or aryl group comprising one to twelve carbon atoms, provided that the number of carbon atoms in $R^1+R^2$ is 3 or higher.

The compositions of the invention are suitable for use in the preparation of coated optical fibers, optical fiber ribbons and optical fiber cables, wherein the cured polyester-based compositions thereby obtained have improved resistance to hydrolysis. The compositions of the invention are particularly advantageous in providing, when cured, a secondary coating, ink layer or upjacketing coating on an optical fiber, or a matrix material to bond coated fibers into a ribbon, or a bundling material to form cable structures from multiple coated optical fibers or ribbons.

It was unexpected that limiting the molecular weight of both the polyester backbone and the urethane oligomer within particular ranges, together with utilizing a diol component having a substituted carbon at the β-position with respect to the hydroxyl groups, would provide polyester-based radiation cured coatings with improved hydrolysis resistance. It was further unexpected that such an improvement in hydrolysis resistance could be achieved by limiting the molecular weight of the polyester backbone, together with utilizing a diol component having a disubstituted carbon at the β-position with respect to the hydroxyl groups, wherein the substituents on the β-carbon total at least 3 carbon atoms.

The radiation curable composition according to the present invention comprises a urethane oligomer which is comprised of a polyester backbone, reactive termini that provide the radiation curable property to the oligomer, and urethane linking groups. In a preferred embodiment, the number average molecular weight of this urethane oligomer is less than about 2000, and more preferably is in the range of between about 900 and about 1800. Urethane oligomer comprising other backbone components such as polyether, polyolefins and polycarbonates may also be present.

A feature of the invention is that the molecular weight of the polyester backbone should be sufficiently low, in particular about 1000 or less. In this way, hydrolysis resistance is optimized. Most preferably the molecular weight of the polyester should be in the range of between about 300 and about 900.

The composition of the polyester backbone according to the invention consists mainly of polymerized diol and diacid components wherein the diol component has at least one carbon at the β-position with respect to the hydroxyl groups which is substituted with a group containing at least one carbon. Where the number average molecular weight of the polyester backbone is limited to less than about 1000, advantageous results can be achieved when the diol component consists of more than 30 wt. % of a diol having one or more groups according to formula 1

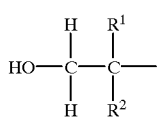

(1)

in which $R^1$ and $R^2$ independently are an alkyl and/or aryl group comprising one to twelve carbon atoms, provided that the number of carbon atoms in $R^1+R^2$ is 3 or higher.

Where, in addition, the number average molecular weight of the urethane oligomer is limited to less than about 2000, then the advantageous results can be achieved where at least about 30 wt. % of the diol component has one or more groups according to formula 1

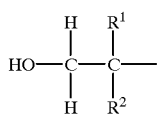

(1)

in which $R^1$ and $R^2$ independently are hydrogen or an alkyl and/or aryl group having 1–24 carbon atoms, with the proviso that the number of carbon atoms of $R^1$ plus $R^2$ is at least 1. Preferably, the number of carbon atoms in $R^1$ plus $R^2$ is at least 2. More preferably, both $R^1$ and $R^2$ each comprise at least one carbon atom. More in particular, the number of carbon atoms in $R^1$ plus $R^2$ is at least 3.

When sterically hindered diols such as according to formula (1) are used, wherein both $R^1$ and $R^2$ each comprise at least one carbon atom and total at least 3 carbon atoms, the molecular weight limitation on the urethane oligomer is less severe. However, best results are obtained in all embodiments of the invention when lower molecular weight oligomers are used.

A very suitable diol is a diol according to formula (2)

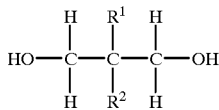

(2)

in which $R^1$ and $R^2$ independently are hydrogen or an alkyl and/or aryl group having 1–24 carbon atoms, with the proviso that the number of carbon atoms of $R^1+R^2$ is at least 1. Preferably, the number of carbon atoms in $R^1$ plus $R^2$ is at least 2. More preferably, both $R^1$ and $R^2$ comprise at least one carbon atom. Most preferred are compounds according to formula 2, in which the number of carbon atoms in $R^1$ plus $R^2$ is at least 3, and in particular between 4–12.

Suitable diols may also be selected from diols according to the formula (3)

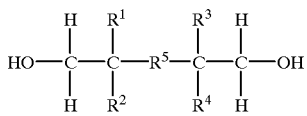

(3)

wherein $R^5$ represents a bond or a hydrocarbon with up to carbons. $R^1$, $R^2$, $R^1$ and $R^4$ each independently represent hydrogen or an alkyl and/or aryl group having 1–24 carbon atoms, with the proviso that at least one of $R^1$, $R^2$, $R^3$ and $R^4$ has at least one carbon atom. Preferably the number of carbon atoms of either or both of ($R^1$ plus $R^2$) and ($R^3$ plus $R^4$) is at least 2, more preferably at least three, and in particular between 4 and 12. More preferably still, each of $R^1$, $R^2$, $R^3$ and $R^4$ has at least one carbon atom, and each of ($R^1$ plus $R^2$) and ($R^3$ plus $R^4$) have a total of at least 3, and in particular between 4 and 12 carbon atoms.

The alkyl and/or aryl group may be linear, branched or cyclic. Hence, methyl, ethyl, n-butyl, i-butyl, n-hexyl, 2-ethylbutyl, phenyl, methyl-phenyl and the like are suitable as any of $R^1$, $R^2$, $R^3$ or $R^4$. Linear or branched alkyl groups are preferred, such as ethyl, n-butyl and i-butyl.

The amount of diol compound in the polyester backbone that has a substituted carbon atom at the β-position with respect to the hydroxyl group is at least about 30 wt. %, preferrably about 50 wt. % or higher, more preferably about 70 wt. % or higher, relative to the total amount of diol component in the polyester backbone. It is particularly preferred that substantially all the diol component in the polyester has such structure.

Suitable diol components for use in the present invention are diols comprising 4–30 carbon atoms such as for example 2-methyl-1,3-propane diol, 2,2-dimethyl-1,3-propanediol, 2-ethyl-1,3-propanediol, 2,2-diethyl-1,3-propanediol, 2-propyl-2-methyl-1,3-propanediol, 2-propyl-2-ethyl-1,3-propanediol, 2-butyl-2-ethyl-1,3-propanediol, 2-cyclohexyl-2-methyl-1,3-propanediol, 2-phenyl-2-methyl-1,3-propanediol, cyclohexyldimethanol, bis[α,α-dimethyl-β-hydroxyethyl]bisphenol-A, bisphenol with etherified neopentylglycol, 2,2-dimethyl-4,4-dimethyl-1,5-pentanediol and the like. These diol components can be used in admixture.

Other diol compounds for making the polyester oligomer may comprise 2–50 carbon atoms such as for example, 1,4-butanediol, 1,6-hexanediol, 1,2-, 1,3- or 1,4-cyclohexanediol, ethoxylated bisphenol-A, 1,2-propanediol, ethyleneglycol, diethylene glycol, dipropylene glycol, polyethyleneglycol, polypropyleneglycol, 1,9-nonanediol, reduced dimer acid and the like. Reduced dimer acids are the hydrogenated analogs of dimer acids which are described in more detail below.

As the acid component, several diacids can be used such as those having 4–30 carbon atoms. Examples of suitable diacid components are adipic acid, glutaric acid, azelaic acid, sebacic acid, dodecane dioic acid, isophthalic acid, terephthalic acid, cyclohexane dicarboxylic acid, dimer-fatty acid and the like. Mixtures of acids may be used. In particular preferred are adipic acid, isophthalic acid, cyclohexane dicarboxylic acid and dimer-fatty acid.

Dimer acids (and esters thereof) are a well known commercially available class of dicarboxylic acids (or esters). They are normally prepared by dimerizing unsaturated long chain aliphatic monocarboxylic acids, usually of 13 to 22 carbon atoms, or their esters (e.g. alkyl esters). The dimerization is thought by those in the art to proceed by possible mechanisms which include Diels Alder, free radical, and carbonium ion mechanisms. The dimer acid material will usually contain 26 to 44 carbon atoms. Particularly, examples include dimer acids (or esters) derived from C-18 and C-22 unsaturated monocarboxylic acids (or esters) which will yield, respectively, C-36 and C-44 dimer acids (or esters). Dimer acids derived from C-18 unsaturated acids, which include acids such as linoleic and linolenic are particularly well known (yielding C-36 dimer acids). For example Δ9, 11 and Δ9, 12 linoleic acids can dimerize to a cyclic unsaturated structure (although this is only one possible structure; other structures, including acyclic structures are also possible). The dimer acid products will normally also contain proportions of trimer acids (e.g. C-54 acids when using C-18 starting acids), possibly even higher oligomers and also small amounts of the monomer acids. Several different grades of dimer acids are available from commercial sources and these differ from each other primarily in the amount of monobasic and trimer acid fractions and the degree of unsaturation.

Usually the dimer acid (or ester) products as initially formed are unsaturated which could possibly be detrimental to their oxidative stability by providing sites for crosslinking or degradation, and so resulting in changes in the physical properties of the coating films with time. It is therefore preferable (although not essential) to use dimer acid products which have been hydrogenated to remove a substantial proportion of the unreacted double bonds.

Herein the term "dimer acid" is used to collectively convey both the diacid material itself, or ester-forming derivatives thereof (such as lower alkyl esters) which would act as an acid component in polyester synthesis and includes (if present) any trimer or monomer.

Further, use can be made of components having one acid and one hydroxyl group, in particular if the carbon atom that is in the β-position with respect to the hydroxyl group is substituted. These types of compounds generally have up to 30 carbon atoms. Examples of suitable α-hydroxy-ω-carboxy groups are 2,2-dimethyl-3-hydroxy-propanoic acid (pivalic acid), or caprolactone, of which the former is preferred. Pivalic acid is most often used as an ester with neopentylglycol, and this is suitable in the present invention as well.

If polyester backbones are to be used with a functionality of higher than two, it is preferred to use a minor amount of tri- or higher functional component. Generally, less than 10 mole % is used. Examples of suitable polyacids and polyalcohols are trimellitic acid, trimethylol propane, trimethylol ethane, pentaerytritol, alkoxylated trimethylol propane and the like. The functionality of the polyester backbone in general will be lower than about 3, and higher than about 1.8. Preferably, the functionaly is about 2.

In view of the low molecular weight, it will be understood that the polyester may comprise only a small number of ester groups, and may be considered to be an oligoester.

The several components, i.e. the diol, diacid, polyol, polyacid and hydroxy acid components may be used in an esterified, anhydride or cyclo-ether form, if available.

The polyester backbone polyols generally are prepared by esterification of the acid and alcohol components at a temperature of over 200° C. Generally, excess alcohol component is used in comparison with the acid component, in order to yield hydroxyl functional oligomers. The polyester synthesis can be carried out by methods well known in the art.

The polyester polyol is reacted with a polyisocyanate and a compound providing the reactive termini in order to yield the urethane oligomer.

Polyisocyanates suitable for use in making the compositions of the present invention include diisocyanates, such as 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexyl)isocyanate, 2,2,4-trimethylhexamethylene diisocyanate, bis(2-isocyanate-ethyl) fumarate, 6-isopropyl-1,3-phenyl diisocyanate, 4-diphenylpropane diisocyanate, lysine diisocyanate, hydrogenated diphenylmethane diisocyanate, hydrogenated xylylene diisocyanate, tetramethylxylylene diisocyanate, and 2,5 (or 6)-bis(isocyanatemethyl)-bicyclo [2.2.1]heptane. Among these diisocyanates, 2,4-tolylene diisocyanate, isophorone diisocyanate, xylylene diisocyanate, and methylenebis(4-cyclohexylisocyanate) are particularly preferred. These diisocyanate compounds are used either individually or in combination of two or more.

The compound providing the reactive termini may comprise a vinyl-unsaturation such as acrylate, methacrylate, vinyl-ether, vinyl-ester, allyl, N-vinyl, and the like. (Meth) acrylate reactive termini are preferred. The reactive termini can be introduced by reacting a hydroxyl functional compound with an isocyanate compound. Examples of hydroxyl functional compounds comprising a vinyl unsaturation are hydroxybutylvinyl-ether, allyl-alcohol, hydroxypropylvinylether and the like.

Examples of the (meth)acrylate compounds having a hydroxyl group which are suitable for use in the present invention include 2-hydroxyethyl (meth)acrylate, 2-hydroxypropyl (meth)acrylate, 2-hydroxybutyl (meth) acrylate, 2-hydroxy-3-phenyloxypropyl (meth)acrylate, 1,4-butanediol mono(meth)acrylate, 2-hydroxyalkyl(meth) acryloyl phosphate, 4-hydroxycyclohexyl (meth)acrylate, 1,6-hexanediol mono(meth)acrylate, neopentyl glycol mono (meth)acrylate, trimethylolpropane di(meth)acrylate, trimethylolethane di(meth)acrylate, pentaerythritol tri(meth) acrylate, dipentaerythritol penta(meth)acrylate, (meth) acrylates represented by the following structural formulas,

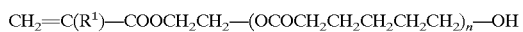

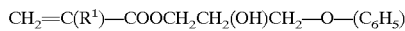

wherein $R^1$ is a hydrogen atom or a methyl group and n denotes an integer of 1–15. In addition, compounds obtained by an addition reaction between a compound containing a glycidyl group, such as, alkyl glycidyl ether, allyl glycidyl ether, or glycidyl (meth)acrylate, and (meth)acrylic acid can also be used. Among these (meth)acrylates having a hydroxyl group, particularly desirable are 2-hydroxyethyl acrylate and 2-hydroxypropyl acrylate. These (meth) acrylates having a hydroxyl group may be used either individually or in combination of two or more.

Oligomers having a backbone based on polyol components other than polyester can be included in the compositions of the invention. Preferrably at least about 30 wt. % of the polyol component of the backbone material will be a polyester polyol, more preferably at least about 60 wt. %.

Suitable other polyols for use in addition to the polyester polyol include polyether diols, hydrocarbon diols, polycarbonate diols, polycaprolactone diols, and the like. These polyols may be used either individually or in combination of two or more. The manner of polymerization of each constitutional unit in these polyols is not specifically limited and may be random polymerization, block polymerization, or graft polymerization.

Specific examples of suitable polyether diols are polyethylene glycol, polypropylene glycol, polytetramethylene glycol, polyhexamethylene glycol, polyheptamethylene glycol, polydecamethylene glycol, and polyether diols obtained by the ring-opening copolymerization of two or more ionic-polymerizable cyclic compounds. Examples of the ionic-polymerizable cyclic compound include cyclic ethers such as ethylene oxide, propylene oxide, butene-1-oxide, isobutene oxide, 3,3'-bischloromethyloxetane, tetrahydrofuran, 2-methyltetrahydrofuran, 3-methyltetrahydrofuran, dioxane, trioxane, tetraoxane, cyclohexene oxide, styrene oxide, epichlorohydrin, glycidyl methacrylate, allyl glycidyl ether, allyl glycidyl carbonate, butadiene monoxide, isoprene monoxide, vinyl oxetane, vinyl tetrahydrofuran, vinyl cyclohexene oxide, phenyl glycidyl ether, butyl glycidyl ether, and glycidylbenzoate. Specific examples of the polyether diol obtained by the ring-opening copolymerization of two or more types of these ionic-polymerizable cyclic compounds include copolymers obtained by the combination of tetrahydrofuran and propylene oxide, tetrahydrofuran and 2-methyltetrahydrofuran, tetrahydrofuran and 3-methyltetrahydrofuran, tetrahydrofuran and ethylene oxide, propylene oxide and ethylene oxide, and ethylene oxide and butene-1-oxide; and ternary copolymers obtained by the combination of tetrahydrofuran, ethylene oxide and butene-1-oxide. It is also possible to use a polyether diol obtained by the ring-opening copolymerization of one of the above-mentioned ionic-polymerizable cyclic compounds and a cyclic imine such as ethylene imine, a cyclic lactone such as β-propiolactone and glycolic acid lactide, or a dimethylcyclopolysiloxane. These ring-opening copolymers of ionic-polymerizable cyclic compounds may be either a random copolymer or a block copolymer.

Specific examples of suitable polycarbonate diols include polycarbonate of polytetrahydrofuran and a polycarbonate of 1,6-hexane diol. The polycarbonate diols can also be commercially available under the trademarks, for example, of DN-980, DN-981, DN-982, DN-983 (Nihon Polyurethane), PC-8000 (PPG of the US), and PC-THF-CD (BASF).

Specific examples of suitable polycaprolactone diols are polycaprolactone diols obtained by the reaction of ε-caprolactone and a diol. Such a diol may be, for example, ethylene glycol, polyethylene glycol, propylene glycol, polypropylene glycol, tetramethylene glycol, polytetramethylene glycol, 1,2-polybutylene glycol, 1,6-hexane diol, neopentyl glycol, 1,4-cyclohexane dimethanol, and 1,4-butane diol. These polycaprolactone diols are commercially available under the trademarks such as PLACCEL 205, 205AL, 212, 212AL, 220, 220AL (Daicell Co., Ltd.).

Other polyol compounds which can be used include dimethylol compounds of ethylene glycol, propylene glycol, 1,4-butane diol, 1,5-pentane diol, 1,6-hexane diol, neopentyl glycol, 1,4-cyclohexane dimethanol, hydrogenated bisphenol A, hydrogenated bisphenol F, or dicyclopentadiene; tricyclodecane dimethanol, pentacyclopentadecane dimethanol, β-methyl-δ-valerolactone, polybutadiene with terminal hydroxyl groups, hydrogenated polybutadiene with terminal hydroxyl groups, castor oil-denatured polyol, polydimethylsiloxane with terminal diols, and polydimethylsiloxane carbitol-denatured polyols. The siloxane comprising diols are in particular useful in the preparation of ink or matrix materials, as these siloxanes add release properties to the cured layers.

The molecular weight of these polyols, in terms of the number average molecular weight based on polystyrene standard, is usually 50–15,000, and preferably 100–8,000.

The urethane oligomer of the invention can be produced by reacting the isocyanate group of the diisocyanate and the hydroxyl group of the polyol and the (meth)acrylate containing a hydroxyl group.

This reaction may be carried out, for example, by a method of reacting the polyol, the diisocyanate, and the (meth)acrylate having a hydroxyl group all together; a method of reacting the polyol and the diisocyanate, and then reacting the resulting product with the (meth)acrylate having a hydroxyl group; a method of reacting the diisocyanate and the (meth)acrylate having a hydroxyl group, and then reacting the resulting product with the polyol; and a method of reacting the diisocyanate and the (meth)acrylate having a hydroxyl group, reacting the resulting product with the polyol, and then again reacting the product thereby obtained with the (meth)acrylate having a hydroxyl group.

The above-mentioned compounds can be used as the polyol, the diisocyante, and the (meth)acrylate having a hydroxyl group in these reactions. The polyol, the diisocyanate, and the (meth)acrylate containing a hydroxyl group are used preferably in a proportion such that for one equivalent of the hydroxyl group of the polyol, 1.1–3 equivalents of the isocyanate group contained in the diisocyanate and 0.2–1.5 equivalents of the hydroxyl group contained in the (meth)acrylate are used. In addition, it is desirable that the equivalent of the hydroxy groups in the polyol and the (meth)acrylate is almost the same as the equivalent of the isocyanate group in the diisocyanate.

In the reaction of these compounds, a catalyst for the urethane forming reaction such as copper naphthenate, cobalt naphthenate, zinc naphthenate, n-butyl-tindilaurylate, triethylamine, 1,4-diazabicyclo[2.2.2]octane, or 2,6,7-trimethyl-1,4-diazabicyclo[2.2.2]octane is used, generally, in an amount of 0.01 to 1 part by weight for 100 parts by weight of the reaction raw materials. The reaction temperature is normally in the range of 10–90° C., preferably of 30–80° C.

The urethane (meth)acrylate thus obtained is incorporated in the composition in an amount of 10–90% by weight. More preferably, the urethane (meth)acrylate will be incorporated an amount of between about 20 and 70% by weight, to provide a coating composition having excellent coatability to the optical fiber, a coated material after cure having superior tensile break strength and tensile elongation at break, and long-term reliability of the resulting products.

In addition to above components, a urethane (meth) acrylate obtained by reacting two moles of urethane (meth) acrylate containing a hydroxyl group with one mol of diisocyanate can be incorporated in the liquid curable resin composition of the present invention. Examples of such a urethane (meth)acrylate include the reaction product of hydroxyethyl (meth)acrylate and 2,5 (or 2,6)-bis-(isocyanatomethyl)-bicyclo[2.2.1]heptane, the reaction product of hydroxyethyl (meth)acrylate and 2,4-tolylene diisocyanate, the reaction product of hydroxyethyl (meth) acrylate and isophorone diisocyanate, the reaction product of hydroxypropyl (meth)acrylate and 2,4-tolylene diisocyanate, and the reaction product of hydroxypropyl (meth)acrylate and isophorone diisocyanate.

In addition to the urethane (meth)acrylate, a polymerizable monomer containing a vinyl group or a (meth)acryloyl group can be added to the liquid curable resin composition of the present invention. Monofunctional monomers and polyfunctional monomers are included in such polymerizable monomers. Examples of suitable monofunctional monomers include monomers containing a vinyl group, such as N-vinyl pyrrolidone, N-vinyl caprolactam, vinyl imidazole, vinyl pyridine; isobornyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acrylate, benzyl (meth)acrylate, 4-butylcyclohexyl (meth)acrylate, acryloyl morpholine, 2-hydroxyethyl (meth)acrylate, 2-hydroxypropyl (meth) acrylate, 2-hydroxybutyl (meth)acrylate, methyl (meth) acrylate, ethyl (meth)acrylate, propyl (meth)acrylate, isopropyl (meth)acrylate, butyl (meth)acrylate, amyl (meth) acrylate, isobutyl (meth)acrylate, t-butyl (meth)acrylate, pentyl (meth)acrylate, isoamyl (meth)acrylate, hexyl (meth) acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth) acrylate, undecyl (meth)acrylate, dodecyl (meth)acrylate, lauryl (meth)acrylate, stearyl (meth)acrylate, isostearyl (meth)acrylate, tetrahydrofurfuryl (meth)acrylate, butoxyethyl (meth)acrylate, ethoxydiethylene glycol (meth) acrylate, benzyl (meth)acrylate, phenoxyethyl (meth) acrylate, polyethylene glycol mono(meth)acrylate, polypropylene glycol mono(meth)acrylate, methoxyethylene glycol (meth)acrylate, ethoxyethyl (meth)acrylate, methoxypolyethylene glycol (meth)acrylate, methoxypolypropylene glycol (meth)acrylate, diacetone (meth) acrylamide, isobutoxymethyl (meth)acrylamide, N,N-dimethyl (meth)acrylamide, t-octyl (meth)acrylamide, dimethylaminoethyl (meth)acrylate, diethylaminoethyl (meth)acrylate, 7-amino-3,7-dimethyloctyl (meth)acrylate, N,N-diethyl (meth)acrylamide, N,N-dimethylaminopropyl (meth)acrylamide, hydroxybutyl vinyl ether, lauryl vinyl ether, cetyl vinyl ether, 2-ethylhexyl vinyl ether; and compounds represented by the following formula (4)

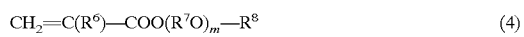

$$CH_2=C(R^6)-COO(R^7O)_m-R^8 \qquad (4)$$

wherein $R^6$ is a hydrogen atom or a methyl group; $R^7$ is an alkylene group containing 2 to 8, preferably 2 to 5 carbon atoms; and m is an integer from 0 to 12, and preferably from 1 to 8; $R^8$ is a hydrogen atom or an alkyl group containing 1 to 12, preferably 1 to 9, carbon atoms; or, $R^8$ is a tetrahydrofuran group-comprising alkyl group with 4–20 carbon atoms, optionally substituted with alkyl groups with 1–2 carbon atoms; or $R^8$ is a dioxane group-comprising alkyl group with 4–20 carbon atoms, optionally substituted with methyl groups; or $R^8$ is an aromatic group, optionally substituted with a $C_1-C_{12}$ alkyl group, preferably a $C_8-C_9$ alkyl group. Commercially available monofunctional compounds include ARONIX M111, M113, M114, M117

(Toagosei Chemical Industry Co., Ltd.), KAYARAD TC110S, R629, R644 (Nippon Kayaku Co., Ltd.), and VISCOAT 3700 (Osaka Organic Chemical Industry, Ltd.).

Examples of the polyfunctional monomers include monomers containing (meth)acryloyl group such as trimethylolpropane tri(meth)acrylate, pentaerythritol (meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth) acrylate, neopentyl glycol di(meth)acrylate, trimethylolpropanetrioxyethyl (meth)acrylate, tris(2-hydroxyethyl) isocyanurate tri(meth)acrylate, tris(2-hydroxyethyl) isocyanurate di(meth)acrylate, tricyclodecanediyldimethyl di(meth)acrylate, and di(meth)acrylate of a diol which is an ethylene oxide or propylene oxide adduct to bisphenol A, di(meth)acrylate of a diol which is an ethylene oxide or propylene oxide adduct to hydrogenated bisphenol A, epoxy (meth)acrylate which is a (meth)acrylate adduct to bisphenol A of diglycidyl ether, diacrylate of polyoxyalkylated bisphenol A, and triethylene glycol divinyl ether. Given as commercially available polyfunctional monomers are YUPIMER-UV, SA1002, SA2007 (Mitsubishi Chemical Co., Ltd.), VISCOAT 700 (Osaka Organic Chemical Industry Ltd.), KAYARAD R-604, DPCA-20, DPCA-30, DPCA-60, DPCA-120, HX-620, D-310, D-330, (Nippon Kayaku Co., Ltd.), and ARONIX M-210, M-215, M-315, M-325 (Toagosei Chemical Industry Co., Ltd.). Among these polyfunctional monomers, tricyclodecanediyldimethyl di(meth) acrylate and diacrylate of polyoxyalkylated bisphenol A are particularly preferred.

These polymerizable monomers are preferably added to the composition in an amount of less than 80 wt %, and particularly preferably 20–70 wt %. If this amount is more than 80 wt %, the curing speed may be slow.

The liquid curable resin composition of the present invention can be cured by radiation. As used in this application, the term radiation means radiation such as visible light, ultraviolet light or electron beam. A photoinitiator can also be added to the liquid curable resin composition of the present invention.

When the liquid curable resin composition of the present invention is cured by UV or visible light radiation, a radiation polymerization initiator is used and, if required, a photosensitizer may be added. Examples of suitable radiation polymerization initiators include 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzil dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propan-1-one, 2,4,6-trimethylbenzoyldiphenyl-phosphine oxide, and bis(2,6-dimethoxybenzoyl)-2,4,4-trimethylpentylphosphine oxide; and commercially available products, such as IRGACURE 184, 369, 651, 500, 907, CGI1700, CGI1750, CGI1850, CG24-61 (Ciba Geigy), LUCIRIN LR8728 (BASF), DAROCURE 1116, 1173 (Merck Co.), and UVECRYL P36 (UCB). Examples of suitable photo-sensitizers are triethylamine, diethylamine, N-methyldiethanolamine, ethanolamine, 4-dimethylaminobenzoic acid, methyl 4-dimethylaminobenzoate, ethyl 4-dimethylaminobenzoate, isoamyl 4-dimethylaminobenzoate, and commercially available products such as UVECRYL P102, P103, P104, and P105 (manufactured by UCB Co).

In addition to the above components, the liquid curable resin composition of the present invention may be formulated with other curable oligomers or polymers to the extent that the effect of the present invention is not adversely affected.

Examples of such other curable oligomers or polymers that may be used include polyester (meth)acrylates, epoxy (meth)acrylates, polyamide (meth)acrylates, siloxane polymers having a (meth)acryloyloxy group, and reactive polymers which are obtained by the reaction of acrylic acid and a copolymer of glycidyl (meth)acrylate and other polymerizable monomer.

Furthermore, amines may be added to the liquid curable resin composition of the present invention to suppress generation of hydrogen gas which causes a transmission loss of optical fibers. The amines which can be added include diarylamine, diisopropylamine, diethylamine and diethylhexylamine.

Additionally, various additives may be added as required, such as antioxidants, UV absorbers, photo-stabilizers, silane coupling agents, thermal polymerization inhibitors, leveling agents, coating surface improvers, surfactants, coloring matters, preservatives, plasticizers, lubricants, solvents, fillers, anti-oxidant, and wettability improvers.

Commercially available antioxidants which can be used are BHT, MEHQ, HQ, IRGANOX 1010, 1035, 1076, 1222 (Ciba Geigy), ANTIGEN P, 3C, FR, GA-80 (Sumitomo Chemical Industries Co., Ltd.), and the like. As UV absorbers, TINUVIN P, 234, 320, 326, 327, 328, 329, 213 (Ciba Geigy), SEESORB 102, 103, 110, 501, 202, 712, 704 (manufactured by Sypro Chemical Co.) can be given.

Commercially available photo-stabilizers which can be added include Tinuvin 292, 144, 622LD (manufactured by Ciba Geigy), Sanol LS770 (manufactured by Sankyo Chemical Co.), and SUMISORB TM-061 (manufactured by Sumitomo Chemical Industries).

Examples of suitable silane coupling agents include γ-aminopropyltriethoxy silane, γ-mercaptopropyltrimethoxy silane, γ-methacryloxypropyl-trimethoxy silane, and commercial products such as SH6062, SH6030 (Toray Silicone Co.) and KBE903, KBE603, KBE403 (Shin-etsu Chemical Co.).

Examples of suitable leveling agents include silicone additives such as dimethylsiloxane polyether and commercially available products, such as DC-57, DC-190 (Dow Corning), SH-28PA, SH-29PA, SH-30PA, SH-190 (Toray-Dow Corning), KF351, KF352, KF353, KF354 (Shin-Etsu Chemical Industries), and L-700, L-7002, L-7500, FK-024-90 (Nippon Uniker).

The viscosity of the liquid curable resin composition of the present invention is normally in the range of 200 to 20,000 cp at 25° C., and preferably 2,000 to 15,000 cp at 25° C.

When the composition is used as a secondary coating or upjacketing coating the Young's modulus of the cured coating preferably is higher than 20 kg/mm$^2$, and more preferably between about 40–200 kg/mm$^2$. The Tg of the cured coating preferably is higher than 40° C., more preferably higher than 50° C. The coating composition generally will comprise a two or three functional acrylate diluent. The coating composition may comprise a pigment or dye to provide a colored cured coating.

When the composition is used as an ink material, the composition preferably comprises 5–15 wt. % of photoinitiator, a subtantial amount of highly functional acrylates (e.g. with a functionality of 4–8), and between about 1–20 wt. % of coloring material. The Tg of a cured ink material generally is higher than 60° C., preferably higher than 80° C. The ink material may comprise, for example, silicone resin to adjust the handling characteristics, and the adhesion to, e.g., the matrix material.

When the composition is used as a ribbon matrix material or a bundling material for optical fibers, the Young's modulus of the composition after cure is normally 10–250 kg/mm², and preferably 40–150 kg/mm².

When the composition is used as a ribbon matrix or a bundling material, it is furthermore desirable that the liquid curable resin composition has surface slip characteristics of 0.1–2.5 kg/cm², particularly 0.1–2.0 kg/cm². If the surface slip characteristic is more than 2.5 kg/cm², optical fiber ribbons cannot be drawn at a specific constant speed when optical fiber cables are manufactured; if less than 0.1 kg/cm², the surface of optical fiber ribbons is too slippery to be orderly wound. Such a surface slip can e.g. be achieved by using siloxane resins in the composition.

The present invention will be hereinafter described in more detail by way of examples which are given for illustration of the present invention and shall not to be construed as limiting the present invention. In the examples hereinafter "part(s) by weight" is simply described as "part(s)".

EXAMPLES I–X AND COMPARISON EXPERIMENTS A–E

Polyesters were prepared by esterification of diacid and diol components at 220° C. using Fascat 4100 (M+T chemicals; butyl stannoic acid) as a catalyst. The polyesters were prepared using 1.37 mole of isophthalic acid, 0.68 mole of a second acid as shown in table 1, 2.73 mole of an alcohol as shown in table 1. The polyester synthesis was stopped when the acid value was less than 5. Polyesters a–e were prepared, having molecular weights (PE MW) as shown in Tables 1 and 2.

The polyesters were used in a urethane synthesis, generally with an equivalent ratio of 2:1:1 (IPDI:HEA:polyester polyol) except in Example E, Table 2, which is 0.51 eq polyesterpolyol, 0.67 eq IPDI and 0.16 eq hydroxyethylacrylate. A diluent was used (isobornylacrylate or octyl decylacrylate) in about 20 wt. %. As a urethanizing catalyst, dibutyl staneous dilaurate was used, together with some BHT as stabilizer each generally at 500 ppm. The isocyanate was mixed with the stabilizer and catalyst. The hydroxyethylacrylate was slowly added in 1–1½ hr. and the mixture was kept at a temperature of below 35° C. Thereafter, the temperature was increased to 40° C. and when the NCO-value was 15%, the polyester polyol was added. The temperature was allowed to increase to 80° C. and the reaction was ended when the amount of NCO was lower than 0.1%. The resulting urethane oligomers had molecular weights (UA MW) as shown in Tables 1 and 2.

For comparison experiment E (table 2), a higher molecular weight urethane oligomer was made using polyester (c) as in Example VIII shown in Table 2.

As another comparison, two commercially available polyester urethane acrylates are used, a general purpose flexible urethane acrylate of Sartomer designated 963B80, comprised of 80 wt. % acrylic aliphatic urethane oligomer and 20 wt. % hexanediol diacrylate; and C1512 from Cargill Inc., Minneapolis, Minn., the polyester urethane acrylate described in U.S. Pat. No. 5,146,531 at column 14, comprised of 75 wt. % acrylic aliphatic urethane oligomer based on a polyester in 25 wt. % hexanediol diacrylate.

It is shown with the present polyesters that it is possible to achieve a resistance against hydrolysis at 30 days aging at 95° C. at 95% relative humidity showing a loss in $E_0$ of less than 10% in high cross-link density coatings which are very suitable as secondary coatings. This is substantially better than the results obtained with the commercially available Cargill C1512 (considered state of the art) and dramatically better than the commercially available general purpose oligomer 963B80.

Abbreviations Used:
IBOA: isobornylacrylate
PEA: phenoxyethylacrylate
HDDA: hexanedioldiacrylate
ODA: octyl/decyl acrylate mixture
PI: photoinitiator Darocur® 1173
PE-MW: molecular weight of the polyester
UA-MW: molecular weight of the urethane oligomer
In table 2 the polyesters were used in compositions having a lower crosslink density. Although the hydrolysis resistance is lower than in the high crosslink density polyesters, nevertheless, the previously observed trend in resistance to hydrolysis is still present in this series. The more highly substituted polyesters demonstrate improved hydrolysis resistance, and are generally better than the commercial samples.

The tensile properties of cured samples were tested using a universal testing instrument, Instron Model 4201 equipped with a suitable personal computer and Instron software to yield values of tensile strength, percent elongation at break, and secant or segment modulus. Load cells had 2 or 20 pound capacity, or metric equivalents.

To prepare the samples for testing, a drawdown (cured film) of each material to be tested was made on a glass plate and cured using a UV processor. The cured film was conditioned at 23±2° C. and 50±5% relative humidity for a minimum of sixteen hours prior to testing. A minimum of eight test specimens, having a width of 0.5+0.002 inches and a length of 5 inches, were cut from the cured film. To minimize the effects of minor sample defects, sample specimens were cut parallel to the direction in which the drawdown of the cured film was prepared. If the cured film was tacky to the touch, a small amount of talc was applied to the film surface using a cotton tipped applicator.

The test specimens were then removed from the substrate. Caution was exercised so that the test specimens were not stretched past their elastic limit during the removal from the substrate. If any noticeable change in sample length had taken place during removal from the substrate, the test specimen was discarded. If the top surface of the film was talc coated to eliminate tackiness, then a small amount of talc was applied to the bottom surface of test specimen after removal from the substrate.

The average film thickness of the test specimens was determined with a micrometer. At least five measurements of film thickness were made in the area to be tested (from top to bottom) and the average value used for calculations. If any of the measured values of film thickness deviated from the average by more than 10% relative, the test specimen was discarded. Film width was also measured. All specimens came from the same plate, and generally, at least six strips were needed to obtain tensile properties.

The appropriate load cell was determined by consideration of the following equation:

$$[A \times 145] \times 0.0015 = C$$

Where: A=a product's maximum expected tensile strength (MPa); 145=Conversion Factor from MPa to psi; 0.0015= approximate cross-sectional area (in2) of test specimens; and C=lbs. The 2 pound load cell was used for materials where C=1.8 lbs. or less. The 20 pound load cell was used for materials where C was between 1.8 and 19 lbs. If C was higher than 19 lbs, a higher capacity load cell was required. Analogous steps were used for metric load cells.

The crosshead speed was set to 1.00 inch/min (or to a metric value equal to ½ the gage length), and the crosshead action was set to "return at break." The crosshead was adjusted to 2.00 inches jaw separation. The air pressure for the pneumatic grips was turned on and adjusted as follows: set at approximately 20 psi (1.5 Kg/cm$^2$) for primary optical fiber coatings and other very soft coatings; set at approximately 40 psi (3 Kg/cm$^2$) for optical fiber single coats; and set at approximately 60 psi (4.5 Kg/cm$^2$) for secondary optical fiber coatings and other hard coatings. An appropriate Instron computer method was loaded for the coating to be analyzed.

After the Instron test instrument had been allowed to warm-up for fifteen minutes, it was calibrated and balanced following the manufacturer's operating procedures. The temperature near the Instron Instrument was measured and the humidity was measured at the location of the humidity gage. This was done just before beginning measurement of the first test specimen.

Specimens were only analyzed if the temperature was within the range 23±2° C., and the relative humidity was within 50±5%. The temperature was verified as being within this range for each test specimen. The humidity value was verified only at the beginning and the end of testing a set of specimens from one plate.

After calibration and standardization, each test specimen was tested by suspending it into the space between the upper pneumatic grips such that the test specimen was centered laterally and hanging vertically. The upper grip (only) was locked. The lower end of the test specimen was pulled gently so that it has no slack or buckling, and it was centered laterally in the space between the open lower grips. While holding the specimen in this position, the lower grip was locked.

The sample number and sample dimensions were entered into the data system, following the instructions provided by the software package. Tensile measurement for the sample was then executed with the Instron device. This was repeated for additional specimens. The temperature and humidity were measured after the last test specimen from the current drawdown was tested.

The calculation of tensile properties was performed automatically by the software package. The values for tensile strength, % elongation, and secant modulus were checked to determine whether any one of them deviated from the average enough to be an "outlier." If necessary, the procedure was repeated.

A dynamic mechanical analysis was also carried out on the test samples. Elastic modulus (E'), viscous modulus (E"), and tan delta (E"/E') were measured by conventional DMA methods. A free film specimen of cured material was cut to size (about 35 mm length), measured for width and thickness and mounted. The environmental chamber containing the sample was brought to 80° C. The sample was stretched before temperature sweep was started. The temperature was lowered in prescribed steps to the starting temperature. The temperature sweep was started and allowed to proceed upwards on the temperature scale until the material was beyond the glass transition range and well into the rubbery range. The DMA instrument (Rheometrics Solids Analyzer, RSA-II equipped with a personal computer) produced a plot of the data on the computer screen. The temperature at which E' is 1,000 MPa and E' is 100 MPa was calculated from this plot, as well as the tan delta peak. The minimum value of E' attained in the rubbery region was measured and reported on Tables 1 and 2 as $E_0$ (equilibrium modulus or rubbery modulus).

Additional test samples prepared in the same manner were subjected to aging in a controlled chamber maintained at 95° C. and 95% relative humidity. After 10 days of aging under these conditions, a set of test samples was removed and tested in accordance with the above dynamic mechanical analysis procedures, and an $E_0$ determined. This value was compared to the $E_0$ prior to aging and the result is reported on Tables 1 and 2 as the percent $E_0$ loss after 10 days aging relative to the initial value. A further set of samples was removed from the chamber after aging for 30 days and tested in the same manner, and the result is reported on Tables 1 and 2 as the percent $E_0$ loss after 30 days aging relative to the initial value.

TABLE 1

|  | I | II | III | IV | V | A | B |
|---|---|---|---|---|---|---|---|
| Oligomer |  |  |  |  |  | 963B80[2] | C1512[3] |
| Polyester | a | b | c | d | e | unknown | unknown |
| Second acid[1] | adipic | adipic | adipic | CHDA | CHDA | unknown | unknown |
| Alcohol | MPD | NPG | EBPD | EBPD | HPHP | unknown | unknown |
| PE MW | 799 | 853 | 830 | 798 | 873 | unknown | unknown |
| UA MW | 1481 | 1530 | 1515 | 1492 | 1610 | unknown | unknown |
| Diluent | IBOA | IBOA | IBOA | IBOA | IBOA | HDDA | HDDA |
| Diluent % | 20.1 | 20.1 | 20.1 | 20.2 | 20.0 | 20.0 | 25.0 |
| Coating |  |  |  |  |  |  |  |
| Olig. % | 48.5 | 48.5 | 48.5 | 48.5 | 48.5 | 48.5 | 48.5 |
| IBOA % | 29.1 | 29.1 | 29.1 | 29.1 | 29.1 | 26.7 | 22.6 |
| PEA % | 9.7 | 9.7 | 9.7 | 9.7 | 9.7 | 9.7 | 9.7 |
| HDDA % | 9.7 | 9.7 | 9.7 | 9.7 | 9.7 | 12.1 | 16.2 |
| PI % | 2.91 | 2.91 | 2.91 | 2.91 | 2.91 | 2.91 | 2.91 |
| Vis mPas | 2255 | 2140 | 1570 | 1740 | 1525 | 855 | 700 |
| Film |  |  |  |  |  |  |  |
| Tensile MPa | 53 | 64 | 62 | 62 | 58 | 53 | 39 |
| Elong % | 5 | 4 | 5 | 4 | 4 | 5 | 10 |
| Mod MPa | 1669 | 1935 | 1824 | 1850 | 1853 | 1604 | 1151 |

TABLE 1-continued

|   | I | II | III | IV | V | A | B |
|---|---|---|---|---|---|---|---|
| $E_0$ MPa | 10.38 | 10.28 | 11.19 | 10.53 | 9.48 | 17.66 | 21.24 |
| $E_0$ loss, %[4] | 10.9 | 16.1 | 7.8 | 0.3 | 8.8 | 20.2 | 6.4 |
| $E_0$ loss, %[5] | 19.9 | 19.8 | 7.9 | 3.4 | 10.3 | 32.0 | 14.9 |

[1]As the second acid, adipic = adipic acid; CHDA = 1,4-cyclohexenedicarboxylic acid. As the alcohol, MPD = 2-methyl-1,3-propanediol; NPG = neopentylglycol; EBPD = 2-ethyl-2-butyl-1,3-propanediol; and HPHP = hydroxypivaloyl hydroxypivalate.
[2]Sartomer CN963B80; 80 wt. % acrylic aliphatic urethane oligomer based on a polyester in 20 wt. % hexanediol diacrylate.
[3]Cargill Inc. 1512, 75 wt. % acrylic aliphatic urethane oligomer based on a polyester in 25 wt. % hexanediol diacrylate.
[4]after aging 10 days at 95 C./95% RH
[5]after aging 30 days at 95 C./95% RH

TABLE 2

|   | VI | VII | VIII | IX | X | C | D | E |
|---|---|---|---|---|---|---|---|---|
| Oligomer |  |  |  |  |  | CN965[2] | C1510[3] |   |
| Polyester | a[(1)] | b | c | d | e | unknown | unknown | c |
| PE MW | 799 | 853 | 830 | 798 | 873 | unknown | unknown | 830 |
| UA MW | 1481 | 1530 | 1515 | 1492 | 1610 | unknown | unknown | 3534 |
| Diluent | IBOA | IBOA | IBOA | IBOA | IBOA | none | none | ODA |
| Diluent % | 20.1 | 20.1 | 20.1 | 20.2 | 20.0 | — | — | 20.0 |
| Coating |  |  |  |  |  |  |  |   |
| Olig. % | 48.5 | 48.5 | 48.5 | 48.5 | 48.5 | 48.5 | 48.5 | 63.1 |
| IBOA % | 29.1 | 29.1 | 29.1 | 29.1 | 29.1 | 29.1 | 29.1 | 15.8 (ODA) |
| PEA % | 19.4 | 19.4 | 19.4 | 19.4 | 19.4 | 19.4 | 19.4 | 18.2 |
| PI % | 2.91 | 2.91 | 2.91 | 2.91 | 2.91 | 2.91 | 2.91 | 2.91 |
| Vis mPas | 2505 | 2475 | 1681 | 1940 | 1750 | 655 | 995 | 26 |
| Film |  |  |  |  |  |  |  |   |
| Tensile MPa | 34 | 43 | 43 | 49 | 41 | 15 | 26 | 4 |
| Elong % | 43 | 11 | 9 | 4 | 6 | 147 | 112 | 174 |
| Mod MPa | 1143 | 1414 | 1379 | 1541 | 1389 | 40 | 406 | 13 |
| $E_0$ MPa | 4.19 | 3.59 | 3.53 | 3.67 | 3.36 | 3.18 | 4.91 | 1.99 |
| $E_0$ loss, %[4] | 5.5 | 7.0 | 10.8 | 5.7 | 15.8 | 40.0 | 8.8 | 31.6 |
| $E_0$ loss, %[5] | 49.4 | 35.4 | 25.5 | 10.3 | 17.9 | 57.2 | 20.6 | 100 |

[(1)]see table 1 for abbreviations

I claim:

1. A radiation curable composition comprising a urethane oligomer with a number average molecular weight of less than about 2000, having at least one vinyl unsaturation terminus and a polyester polyol backbone with a number average molecular weight of less than about 1000, wherein the polyester polyol is at least in part based on a diol component which has a substituted carbon at the β-position with respect to the hydroxyl groups wherein the substituents on the β-carbon comprise a total of at least three carbons.

2. A coated optical fiber having a primary and a secondary coating in which the secondary coating comprises a radiation cured composition which comprises, prior to cure, a urethane oligomer with a number average molecular weight of less than about 2000, having at least one vinyl unsaturation terminus and a polyester polyol backbone with a number average molecular weight of less than about 1000, wherein the polyester polyol is at least in part based on a dial component which has a substituted carbon at the β-position with respect to the hydroxyl groups wherein the substituents on the β-carbon comprise a total of at least three carbons.

3. A coated optical fiber having a primary and a secondary coating, and a radiation cured ink layer, in which the ink comprises, prior to cure, a urethane oligomer with a number average molecular weight of less than about 2000, having at least one vinyl unsaturation terminus and a polyester polyol backbone with a number average molecular weight of less than about 1000, wherein the polyester polyol is at least in part based on a diol component which has a substituted carbon at the β-position with respect to the hydroxyl groups wherein the substituents on the β-carbon comprise a total of at least three carbons.

4. A ribbon comprised of a plurality of coated optical fibers, said fibers being bonded together with a radiation cured matrix material, in which the matrix material comprises, prior to cure, a urethane oligomer with a number average molecular weight of less than about 2000, having at least one vinyl unsaturation terminus and a polyester polyol backbone with a number average molecular weight of less than about 1000, wherein the polyester polyol is at least in part based on a dial component which has a substituted carbon at the β-position with respect to the hydroxyl groups wherein the substituents on the β-carbon comprise a total of at least three carbons.

5. A coated optical fiber having a primary coating and at least one further coating layer, the coated fiber having a total thickness of over 300 μm including an upjacketing cured coating as the outermost layer, in which the upjacketing coating comprises, prior to cure, a urethane oligomer with a number average molecular weight of less than about 2000, having at least one vinyl unsaturation terminus and a polyester polyol backbone with a number average molecular weight of less than about 1000, wherein the polyester polyol is at least in part based on a diol component which has a substituted carbon at the β-position with respect to the hydroxyl groups wherein the substituents on the β-carbon comprise a total of at least three carbons.

6. A ribbon structure comprising a plurality of ribbons of coated optical fibers, bonded together with a radiation cured bundling material, in which the bundling material comprises, prior to cure, a urethane oligomer with a number average molecular weight of less than about 2000, having at least one vinyl unsaturation terminus and a polyester polyol backbone with a number average molecular weight of less than about 1000, wherein the polyester polyol is at least in part based on a diol component which has a substituted carbon at the β-position with respect to the hydroxyl groups wherein the substituents on the β-carbon comprise a total of at least three carbons.

7. A urethane oligomer comprising a polyester polyol backbone, uretlanc linking groups, and reactive termini comprising at least one vinyl unsaturation terminus, in which the polyester polyol backbone has a molecular weight of less than about 1000 and essentially consists of polymerized diols and diacid components, wherein at least about 30 wt. % of the diol component prior to polymerization has one or more groups according to formula (1)

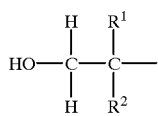

(1)

wherein $R^1$ and $R^2$ each independently represent an alkyl or aryl group comprising one to twelve carbon atoms, provided that the total number of carbon atoms in $R^1$ plus $R^2$ is at least 3.

8. The urethane oligomer of claim 7 wherein at least about 50 wt. % of the diol component prior to polymerization has one or more groups according to formula (1).

9. The urethane oligomer of claim 7 wherein at least about 70 wt. % of the diol component prior to polymerization has one or more groups according to formula (1).

10. A urethane oligomer comprising a polyester polyol backbone, urethane linking groups, and reactive termini comprising at least one vinyl unsaturation terminus, in which the polyester polyol backbone has a molecular weight of less than about 1000 and essentially consists of polymerized diols and diacid components, wherein at least about 30 wt. % of the diol component prior to polymerization is of the formula (2)

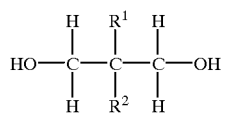

(2)

wherein $R^1$ and $R^2$ each independently represent an alkyl or aryl group comprising one to twelve carbon atoms, provided that the total number of carbon atoms in $R^1$ plus $R^2$ is at least 3.

11. A urethane oligomer comprising a polyester polyol backbone, urethane linking groups, and reactive termini comprising at least one vinyl unsaturation terminus, in which the polyester polyol backbone has a molecular weight of less than about 1000 and essentially consists of polymerized diols and diacid components, wherein at least about 30 wt. % of the diol component prior to polymerization is of the formula (3)

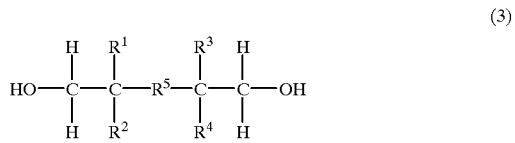

(3)

wherein $R^1$ and $R^2$ each independently represent an alkyl or an aryl group comprising one to twelve carbon atoms, provided that the total number of carbon atoms in $R^1$ plus $R^2$ is at least 3, $R^3$ and $R^4$ each independently represent hydrogen, an alkyl or an aryl group having 1–24 carbon atoms, and $R^5$ represents a bond or a hydrocarbon with up to 30 carbons.

12. The urethane oligomer of claim 11 wherein $R^3$ and $R^4$ each independently represent an alkyl or an aryl group comprising up to twelve carbon atoms.

13. A radiation curable composition comprising a urethane oligomer with a number average molecular weight of less than about 2000, having at least one vinyl unsaturation terminus and a polyester polyol backbone with a number average molecular weight of loss than about 1000 and essentially consists of polymerized diols and diacid components, wherein at least about 30 wt. % of the diol component prior to polymerization has one or more groups according to formula (1)

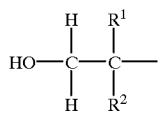

(1)

wherein $R^1$ and $R^2$ each independently represent hydrogen, an alkyl or an aryl group having 1–24 carbon atoms, with the proviso that the number of carbon atoms of $R^1$ plus $R^2$ is at least 3.

14. The radiation curable composition of claim 13 wherein $R^1$ and $R^2$ each independently represent an alkyl or an aryl group comprising one to twelve carbon atoms, provided that the total number of carbon atoms in $R^1$ plus $R^2$ is at least 3.

15. A radiation curable composition comprising a urethane oligomer with a number average molecular weight of less than about 2000, having at least one vinyl unsaturation terminus and a polyester polyol backbone with a number average molecular weight of less than about 1000 and essentially consists of polymerized diols and diacid components, wherein at least about 30 wt. % of the diol component prior to polymerization is of the formula (2)

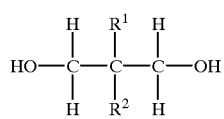

(2)

wherein $R^1$ and $R^2$ each independently represent hydrogen, an alkyl or an aryl group having 1–24 carbon atoms, with the proviso that the number of carbon atoms of $R^1$ plus $R^2$ is at least 3.

16. The radiation curable composition of claim 15 wherein $R^1$ and $R^2$ each independently represent an alkyl or an aryl group comprising one to twelve carbon atoms, provided that the total number of carbon atoms in $R^1$ plus $R^2$ is at least 3.

17. A radiation curable composition comprising a urethane oligomer with a number average molecular weight of less than about 2000, having at least one vinyl unsaturation terminus and a polyester polyol backbone with a number average molecular weight of less than about 1000 and essentially consists of polymerized diols and diacid components, wherein at least about 30 wt. % of the diol component prior to polymerization has one or more groups according to formula (3)

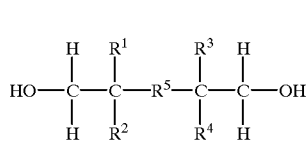

(3)

wherein $R^1$, $R^2$, $R^3$ and $R^4$ each independently represent hydrogen, an alkyl or an aryl group having 1–24 carbon atoms, with the proviso that at least one of $R^1$, $R^2$, $R^3$ and $R^4$ has at least one carbon atom, and wherein $R^5$ represents a bond or a hydrocarbon with up to 30 carbons.

18. The radiation curable composition of claim 17 wherein $R^1$ and $R^2$ each independently represent an alkyl or an aryl group comprising one to twelve carbon atoms, provided that the total number of carbon atoms in $R^1$ plus $R^2$ is at least 3.

19. The radiation curable composition of claim 17 wherein each of $R^1$, $R^2$, $R^3$ and $R^4$ has at least one carbon atom, and each of ($R^1$ plus $R^2$) and ($R^3$ plus $R^4$) have a total of at least 3 carbon atoms.

20. A radiation curable composition containing radiation curable urethane oligomer units comprised of a polyol backbone, urethane linking groups and reactive termini comprising at least one vinyl unsaturation terminus, wherein at least about 30 wt. % of said polyol backbone is a polyester polyol having a molecular weight of less than about 1000 and consists essentially of polymerized diols and diacid components, wherein at least about 30 wt. % of the diol component prior to polymerization has one or more groups according to formula (1)

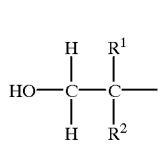

(1)

wherein $R^1$ and $R^2$ each independently represent an alkyl or aryl group comprising one to twelve carbon atoms, provided that the total number of carbon atoms in $R^1$ plus $R^2$ is at least 3; and wherein up to about 70 wt. % of said polyol backbone is selected from the group of other polyols consisting of polyether diols, hydrocarbon diols, polycarbonate diols and polycaprolactone diols.

21. The radiation curable composition of claim 20 wherein at least about 60 wt. % of said polyol backbone is said polyester polyol, and up to about 40 wt. % of said polyol backbone is selected from the group of said other polyols.

* * * * *